United States Patent [19]

Jerabek

[11] 3,925,180

[45] Dec. 9, 1975

[54] ELECTRODEPOSITION PROCESS USING A NOVEL PIGMENT DISPERSANT

[75] Inventor: Robert D. Jerabek, Glenshaw, Pa.

[73] Assignee: PPG Industries, Inc., Pittsburgh, Pa.

[22] Filed: Jan. 3, 1974

[21] Appl. No.: 430,450

Related U.S. Application Data

[60] Division of Ser. No. 248,752, April 28, 1972, Pat. No. 3,842,111, which is a continuation-in-part of Ser. No. 193,590, Oct. 28, 1971.

[52] U.S. Cl. .............................................. 204/181
[51] Int. Cl.$^2$ ................. C25D 13/06; C25D 13/10
[58] Field of Search ............... 204/181; 106/308 N

[56] References Cited
UNITED STATES PATENTS

| | | | |
|---|---|---|---|
| 3,617,458 | 11/1971 | Brockman | 204/181 |
| 3,640,926 | 2/1972 | Slater et al | 204/181 |

*Primary Examiner*—Howard S. Williams
*Attorney, Agent, or Firm*—William J. Uhl

[57] ABSTRACT

It has been found that basic nitrogen-containing adducts of glycidyl ethers or esters containing an acyclic hydrocarbon chain of at least eight carbon atoms with secondary amine or a tertiary amine salt are useful as grinding media in preparing stable pigment dispersions useful in water-soluble coating systems, for example, electrodepositable compositions.

6 Claims, No Drawings

ELECTRODEPOSITION PROCESS USING A NOVEL PIGMENT DISPERSANT

CROSS-REFERENCE TO RELATED APPLICATIONS

This application division of copending Application Ser. No. 248,752, filed Apr. 28, 1972, now U.S. Pat. No. 3,842,111, which, in turn, is a continuation-in-part of Application Ser. No. 193,590, filed Oct. 28, 1971.

STATE OF THE ART

In the formation of paint compositions and especially electrodepositable paint compositions, an important factor is the introduction of pigments into the coating composition. Pigments are typically ground in a dispersing agent and then the resultant pigment paste is incorporated into the coating composition to give the coating composition proper color, or opacity and application or film properties.

The time required for grinding some pigments and dispersing of these pigments poses a problem in some instances. Further, electrodepositable compositions have been frequently found wherein the resin which ultimately makes up the majority of the vehicle resin present in the composition is not suitable as a grinding medium, since the pigment paste formed does not have stable properties and upon storage for any length of time produces a composition which cannot be readily dispersed or which adversely affects the properties of the electrodepositable composition ultimately formed.

DESCRIPTION OF THE INVENTION

It has now been found that stable pigment paste for cationic electrodepositable compositions can be prepared by using as the dispersing media a basic nitrogen containing adduct of a long chain glycidyl ether or ester. This grinding media allows for the preparation of pigment pastes which are stable and which are compatible with cationic electrodepositable vehicle resin compositions based on amine group-containing solubilized electrodepositable resins.

The basic nitrogen-containing adducts utilized to form the pigment pastes of the instant invention are adducts of fatty acid glycidyl ethers or esters of a fatty alcohol or acid. By fatty alcohol or acid is meant an acyclic acid or alcohol containing 8 to 24 carbon atoms. Typical examples of these acids and alcohols include the saturated straight chain and branched chain series of fatty alcohols and acids as well as ethylenically unsaturated species and mixtures thereof, including octanoic or 2-ethyl hexanoic acid at the lower end proceeding to lauric, palmitic, stearic, etc., at the upper end of the group. Highly-branched tertiary carboxylic acid mixtures such as Shell's Versatic 911 acids are also useful. Fatty alcohols of equivalent chain length are used for the preparation of the glycidyl ethers.

The glycidyl ethers or esters are well noted in the art and in some cases are items of commerce and their preparation need not be discussed in detail. Particularly useful are Proctor and Gambles' Epoxide 7 to Epoxide 45 Series of glycidyl ethers as well as Shell Chemical Company's Cardura E glycidyl ester.

The basic nitrogen-containing adduct is prepared by reacting the glycidyl compound with a secondary amine or a tertiary amine salt. The secondary amine may be any water-soluble secondary amine, including alkyl amines and alkanolamines. Also useful is a diketimine having a free secondary amine group, for example, the diketimine derived from one mole of diethylenetriamine and two moles of methylisobutyl ketone (Shell's curing agent H-1), which reacts through the free amine group. When the product of this reaction is contacted with water, the ketimine groups are hydrolyzed, forming free primary amine groups in addition to the tertiary amine group formed in the initial reaction.

The tertiary amine salts may be any water-soluble tertiary amine salt, and is preferably a salt of an acid having a dissociation constant greater than $1 \times 10^{-5}$ and, most preferably, is an organic acid. Suitable acids include boric acid, hydrochloric acid, phosphoric and sulfuric acid, lactic acid, acetic acid, propionic acid and butyric acid.

The amines from which the salts are formed include any unsubstituted organic amine or amine substituted with non-reactive substituents, such as halogen or hydroxyl amines. Specific amines include triethylamine, dimethylethanolamine trimethylamine and the like. The presently preferred amine salt is dimethylethanolamine lactate.

The basic nitrogen-containing adduct is prepared by reacting the glycidyl ether or ester with the secondary amine or tertiary amine salt in approximately a 1:1 mole ratio. The reaction proceeds at room temperature in most cases and in some instances exothermically so that moderate cooling may be necessary. In some cases moderately elevated temperatures are preferred. Typically, the reaction is conducted between about 50°C. and about 110°C. The reaction may be conducted in the presence of a solvent if desired. If a solvent is employed, preferably it is compatible and useful in the ultimate composition which is formed. For example, alcohols, ketones and glycol ethers may be used.

The resultant adduct is preferably insoluble in water unless solubilized with an acid.

The novel pigment dispersant of the invention comprises the above-described adduct or a solution thereof, which is at least partially neutralized with a water-soluble acid such as is conventionally employed in solubilizing cationic water-based, and particularly electrodepositable, compositions. Sufficient acid is usually employed to prepare an aqueous dispersion and this usually comprises at least about 50 percent theoretical neutralization.

The pigment pastes of the invention are prepared by grinding or dispersing a pigment in the presence of a pigment dispersant in a manner well known in the art.

The pigment paste comprises as essential ingredient the dispersant and at least one pigment; however, the paste may, in addition, contain other adjuvants such as plasticizers and the like, or wetting agents, surfactants or defoamers.

The pigment dispersant is employed in a vehicle to prepare a pigment paste in the manner well known in the art.

Generally and preferably the pigment paste is prepared in the presence of water and in that case contains in general at least about 50 percent water, although less can be employed and, in fact, the pigment dispersant of the invention can be utilized to prepare non-aqueous pigment pastes which are subsequently dispersible in water-based compositions.

Any of the conventional pigments employed in water-based and particularly electrodeposition compositions may be dispersed in the above-described dispersants.

The pigment and dispersant may be ground in the conventional manner such as in a steel ball mill, attritor, or sand mill.

The pigment and dispersant ratios vary from pigment to pigment over a wide range, usually from about two percent to about 50 percent by weight of dispersant, based on pigment weight, may be used.

The final electrodepositable composition may contain, in addition to the pigment dispersion and acid solubilized amine group-containing resin, crosslinking resins, solvents, antioxidants, surfactants and other adjuvants typically employed in the electrodepositable composition.

A number of amine group-containing, acid-solubilized, cationic electrodepositable resins are known in the art and need not be described in detail. Virtually any polyamine group-containing resin which can be acid-solubilized may be employed as an aqueous coating composition. Preferably the resin also contains hydroxyl groups. These resins include multicomponent resin systems which contain two essential components, for example, a polyamine group-containing resin together with a fully capped organic polyisocyanate described in copending Application Ser. No. 47,917, filed June 19, 1970, now U.S. Pat. No. 3,799,854 and Ser. No. 193,590, filed Oct. 28, 1971, which are hereby incorporated by reference; as well as in systems containing an essentially self-curing resin system, for example, resin containing amine groups, hydroxyl groups and capped isocyanate groups within the same molecule, where the capped isocyanate groups are stable at room temperature in the presence of hydroxyl or amine groups but reactive with hydroxyl groups at elevated temperatures. Preferably, the isocyanate groups are capped with an aliphatic alkyl, alkoxyalkyl, cycloaliphatic alkyl, or aromatic alkyl monoalcohol or an oxime. Preferably, the resin contains about 0.5 to about 2.0 latent isocyanate groups per hydroxyl group. Resins within this class are described in copending Application Ser. No. 193,591, filed Oct. 28, 1971 and Ser. No. 203,875, filed Dec. 1, 1971, which are hereby incorporated by reference.

Enough pigment paste is used to that the final electrodepositable composition has the desirable properties. In most instances, the final electrodepositable composition has a pigment-to-binder ratio of between about 0.05 to about 0.5.

In electrodeposition processes employing the aqueous coating compositions described above, the aqueous composition is placed in contact with an electrically-conductive anode and an electrically-conductive cathode in an electric circuit. While in contact with the bath containing the coating composition, an adherent film of the coating composition is deposited on the cathode. This is in contrast to processes utilizing polycarboxylic acid resins which deposit on the anode, and many of the advantages described above are in large part attributed to this cathodic deposition.

The conditions under which the electrodeposition is carried out are, in general, similar to those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot, and tens to decrease during electrodeposition.

The method of the invention is applicable to the coating of any electrically-conductive substrate, and especially metals such as steel, aluminum, copper or the like.

After deposition, the coating is cured at elevated temperatures by any convenient method such as in baking ovens or with banks of infrared heat lamps.

Illustrating the invention are the following examples, which are not to be construed as limiting the invention to their details. All parts and percentages in the examples, as well as throughout this specification, are by weight unless otherwise specified.

EXAMPLE I

A cationic pigment dispersant was prepared by heating 746.2 parts of stearyl glycidyl ether (Proctor and Gamble's Epoxide 45) and 224 parts of ethylene glycol monobutyl ether to about 50°C. and adding 150.2 parts of n-methyl ethanolamine over a 30-minute period with external cooling to keep the batch temperature below 100°C. When all the amine was added, the batch was held an additional hour at 100°C. before cooling and storage.

To prepare a grinding vehicle from this cationic pigment dispersant, 200 parts were blended with 39.5 parts of 88 percent lactic acid and 515 parts of deionized water.

To prepare a pigment paste, 90 parts of this grinding vehicle was blended with four parts of acetylenic alcohol defoamer (Surfynol 104-A), 60 parts of phthalocyanine blue, 140 parts of iron oxide brown and 306 parts of deionized water, and the resultant slurry ground in a suitable mill to a Hegman No. 7.

EXAMPLE II

An amine-epoxy adduct was prepared as follows:

One thousand eight hundred thirty parts of polyglycidyl ether of bisphenol A (Epon 1004) possessing an epoxy equivalent weight of 915 were dissolved in 353.2 parts of methyl butyl ketone by heating to reflux at 130°C. with agitation in order to remove any water present by use of a decanting trap in the distillate return line. Upon cooling to 80°C. under a dry nitrogen blanket, 52 parts of the diketimine derived from one mole of diethylene triamine and 2 moles of methyl isobutyl ketone (as described in U.S. Pat. No. 3,523,925) and 138.8 parts diethylamine were added and the batch heated to 120°C., where it was held approximately 2 hours and then thinned with 326 parts of propylene glycol monomethyl ether. The resultant polytertiary amine cationic resin containing potential primary amine groups (to be generated from the ketimine moiety upon water addition) was stored for subsequent use. This product was identified as Adduct C.

In order to prepare a reactive cationic plasticizer, the 2-ethylhexanol monourethane of 2,4-toluene diisocyanate was first prepared by adding 1953 parts of 2-ethylhexanol to 2610 parts of 2,4-toluene diisocyanate and 200 parts methyl butyl ketone over a 5-hour period with agitation and external cooling to maintain the batch reaction temperature below 20°C. The batch was then thinned with 100 parts of methyl butyl ketone and stored under dry nitrogen.

In another reactor, 456 parts of the above 2-ethylhexanol monourethane of 2,4-TDI (1.5 equivalents of free isocyanate) was added to 769.5 parts (1.5 equivalents) of polyoxypropylene diamine (Jefferson's Jeffamine D-1000) possessing an amine equivalent weight of 512 over a 20-minute period at 40°C., and then thinned with 189 parts of methyl butyl ketone to yield a reactive cationic plasticizer of 85.2 percent nonvolatile content.

In another reactor, the 2-ethylhexanol diurethane of 80/20 2,4/2,6-toluene diisocyanate was prepared by slowly adding 87.1 parts of 80/20 2,4/2,6-TDI to 143 parts of 2-ethylhexanol containing one drop of dibutyl tin dilaurate with external cooling to maintain the reaction mixture below 100°C.

To prepare an electrodepositable thermosetting cationic urethane composition, 741 parts of the above polytertiary amine cationic resin (Adduct C), 57 parts of ethylene glycol monohexyl ether, 134 parts of the above reactive cationic plasticizer, 231 parts of the above 2-ethylhexanol diurethane and 18 parts dibutyl tin dilaurate catalyst were blended and then solubilized with 46 parts of 88 percent lactic acid and 1773 parts deionized water.

To pigment this composition, 1216 parts of it were blended with 247 parts of the pigment paste described in Example I, and the batch thinned to about 12 percent non-volatile content with 2337 parts of deionized water.

This electrodeposition bath showed a pH of 6.0 and 2 minute throwpower of 10 inches at 280 volts. Films deposited cathodically for two minutes at 280 volts on zinc phosphated steel and baked 45 minutes at 350°F. yielded smooth, hard, flexible films of 0.5 mil thickness.

EXAMPLE III

A 2-ethylhexanol monourethane of 2,4-toluene diisocyanate was prepared by adding 585.9 parts of 2-ethylhexanol to an agitated mixture of 793 parts of 2,4-toluene diisocyanate and 60 parts of methyl butyl ketone over approximately a 5-hour period with external cooling to maintain the reaction temperature below 30°C. After the addition was complete, an additional 30 parts of methyl butyl ketone was added; and the batch stored under dry nitrogen for subsequent use.

A self-crosslinking cationic polyurethane resin was then prepared by first dissolving 632.4 parts of polyglycidyl ether of bisphenol A (Epon 1001) possessing an equivalent weight of 526 per epoxide group, in 177.4 parts of methyl butyl ketone, and refluxing for about 15 minutes to remove any water present by use of a decanting trap in the distillate return line. After cooling to 70°C., 87.7 parts of diethylamine were introduced and the batch heated to about 140°C. with removal of about 100 parts of solvent. The batch was then cooled to 100°C., the solvent replaced, and 522.4 parts of the above 2-ethylhexanol monourethane of 2,4-toluene diisocyanate added. Upon heating the batch to 120°C., over a one-hour period, all NCO was found to have reacted, as indicated by an infrared scan. The batch was then thinned to 78 percent solids with 196 parts of propylene glycol monomethyl ether.

A reactive plasticizer for use with this self-crosslinking cationic urethane resin was then prepared by adding 248 parts of the 2-ethylhexanol monourethane of 2,4-toluene diisocyanate to 1250 parts of polytetramethylene glycol (Quaker Oats' POLYMEG 3000) possessing an average molecular weight of 2940 and heating the mixture to 100°–110°C. and holding for about 5 hours until all NCO groups were reacted, as determined by infra-red scanning.

To 487 parts of the above cationic urethane was blended 43 parts of the above reactive plasticizer, and 38 parts ethylene glycol monohexyl ether. This mixture was neutralized with 39 parts 88 percent lactic acid, then blended with 8 parts dibutyl tin dilaurate, 215 parts of the pigment paste of Example I and, finally, thinned with 3465 parts of deionized water. This pigmented self-crosslinking polyurethane cationic electrodepositable composition of approximately 12 percent solids showed a pH of 4.5, conductivity of 875 mmhos./cm., and 2-minute Ford throw power of 7-3/8 inches at 350 volts.

When cathodically deposited upon an untreated cold-rolled steel panel for 2 minutes at 350 volts, and cured 45 minutes at 350°F., this composition yielded a smooth film of 0.3 mil thickness and 3H pencil hardness, which when scribed and placed in a salt fog cabinet at 100°F. for 14 days displayed little or no rust creepage at the scribe.

EXAMPLE IV

A 2-ethylhexanol monourethane of 2,4-toluene diisocyanate was prepared by adding 1953 parts of 2-ethylhexanol to an agitated mixture of 2610 parts of 2,4-TDI and 200 parts of methyl butyl ketone over approximately a three-hour period with external cooling to maintain the reaction temperature below 18°C. After the addition was completed, the product was stored under dry nitrogen for subsequent use.

A self-crosslinking cationic polyurethane-containing free primary amine groups was prepared by first dissolving 700 parts of polyglycidyl ether of Bisphenol A (Epon 1001) possessing an equivalent weight of 492 per epoxide group, in 150 parts of methylbutyl ketone, and refluxing about 30 minutes at 130°C. to remove any water present by use of a decanting trap in the distillate return line. After cooling to 100°C., 598.3 parts of the above 2-ethylhexanol monourethane of 2,4-toluene diisocyanate was added, along with ten drops of dibutyl tin dilaurate.

The batch was heated to 120°C. and held about 35 minutes, at which time 143.2 parts of ethylene glycol monohexyl ether was added, followed by 96.1 parts of n-methyl ethanolamine and 73.8 parts of the diketimine derived from one mole of diethylene triamine and 2 moles of methylisobutyl ketone (Shell Chemical Company's curing agent H-1). The batch was held at 100°C. for about 2 hours, at which time 1400 parts of it were poured into an agitated vessel containing 831 parts of deionized water and 72 parts of 88 percent lactic acid. After cooling to 110°F., 23 parts of dibutyl tin dilaurate were added to the mixture and it was thinned for subsequent use to 40 percent non-volatile content with 582 parts of deionized water.

A cationic pigment dispersant was prepared by heating 746.2 parts of stearyl glycidyl ether (Proctor and Gamble's Epoxide 45) and 224 parts of ethylene glycol monobutyl ether to about 50°C. and adding 150.2 parts of n-methyl ethanolamine over a 30 minute period with external cooling to keep the batch temperature below 100°C. When all the amine was added, the batch was held an additional hour at 100°C. before cooling and storage. To prepare a grinding vehicle from this cationic pigment dispersant, 200 parts were blended with 38.5 parts of 88 percent lactic acid and 515 parts of deionized water. To prepare a pigment paste 90 parts of this grinding vehicle were blended with 4 parts of acetylenic alcohol defoamer (Surfynol 104-A), 60 parts of phthalocyanine blue, 140 parts of iron oxide brown and 306 parts of deionized water, and the resultant slurry ground in a steel ball mill.

A pigmented, self-crosslinking cationic, primary amine-containing, electrodepositable composition was prepared by blending 228 parts of the above paste with 930 parts of the above 40 percent non-volatile cationic resin dispersion and reducing with 2642 parts of deionized water. This coating bath showed a pH of 6.4, a conductivity of 1510 mmhos./cm., and a 2-minute throw power (Ford) of 8-½ inches at 250 volts.

Films deposited cathodically for two minutes at 250 volts on zinc phosphated steel panels showed 0.4 mil film thickness after curing 20 minutes at 400°F. and showed no scribe creepage when exposed to salt fog at 100°F. for 2 weeks.

In a manner similar to that specifically described, various other adducts can be prepared using various glycidyl compounds and amine compounds within the disclosure above. Likewise, other pigments and electrodepositable resins may be employed to achieve similar results.

According to the provisions of the Patent Statutes, there are described above the invention and what are now considered to be its best embodiments; however, within the scope of the appended claims, it is to be understood that the invention can be practiced otherwise than as specifically described.

I claim:

1. A method of electrocoating an electrically-conductive surface serving as a cathode in an electrical circuit comprising said cathode, an anode and an aqueous electrodepositable composition wherein the electrodepositable composition comprises an aqueous dispersion of:
    A. an acid-solubilized polyamine group-containing resin and
    B. a pigment paste comprising
        1. an adduct comprising the reaction product of:
            a. a fatty glycidyl ether or ester; and
            b. a secondary amine or tertiary amine salt; said adduct being at least partially neutralized with a water-soluble acid; and
        2. a pigment dispersed therewith.

2. A method as in claim 1 wherein (a) is a fatty glycidyl ether.

3. A method as in claim 2 wherein (b) is a lower alkyl or alkanol substituted secondary amine.

4. A method as in claim 1 wherein (A) is an acid-solubilized, self-curing, synthetic organic resin containing amino groups, hydroxyl groups and capped isocyanate groups stable at room temperature in the presence of hydroxyl or amino groups and reactive with hydroxyl groups at elevated temperatures.

5. A method as in claim 4 wherein (a) is a fatty glycidyl ether.

6. A method as in claim 4 wherein (b) is a lower alkyl or alkanol substituted secondary amine.

* * * * *

UNITED STATES PATENT OFFICE
CERTIFICATE OF CORRECTION

PATENT NO : 3,925,180
DATED : December 9, 1975
INVENTOR(S) : Robert D. Jerabek

It is certified that error appears in the above–identified patent and that said Letters Patent are hereby corrected as shown below:

Under "Related U.S. Application Data" on the cover page, Patent No. "3,842,111" should be --3,824,111--.

Column 1, line 9, "3,842,111" should be --3,824,111--.

Signed and Sealed this thirtieth Day of March 1976

[SEAL]

Attest:

RUTH C. MASON
Attesting Officer

C. MARSHALL DANN
Commissioner of Patents and Trademarks